United States Patent
Vladimerou

(10) Patent No.: US 10,352,704 B2
(45) Date of Patent: *Jul. 16, 2019

(54) SYSTEM AND METHOD FOR DETECTION OF VEHICLE LANE DEPARTURE

(71) Applicant: Toyota Motor Engineering & Manufacturing North America, Inc., Plano, TX (US)

(72) Inventor: Vladimeros Vladimerou, Whitmore Lake, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/018,686

(22) Filed: Jun. 26, 2018

(65) Prior Publication Data

US 2018/0306583 A1    Oct. 25, 2018

Related U.S. Application Data

(63) Continuation of application No. 14/997,550, filed on Jan. 17, 2016, now Pat. No. 10,030,978.

(51) Int. Cl.
*B60W 30/12* (2006.01)
*B60W 30/18* (2012.01)
(Continued)

(52) U.S. Cl.
CPC ......... *G01C 21/16* (2013.01); *B60W 30/0956* (2013.01); *B60W 30/12* (2013.01);
(Continued)

(58) Field of Classification Search
CPC .............................. G01C 21/16; B60W 30/12
See application file for complete search history.

(56) References Cited

U.S. PATENT DOCUMENTS

| | | |
|---|---|---|
| 6,107,939 A | 8/2000 | Sorden |
| 6,292,752 B1 | 9/2001 | Franke et al. |

(Continued)

FOREIGN PATENT DOCUMENTS

| | | |
|---|---|---|
| DE | 10118265 A1 | 10/2002 |
| WO | 2017064330 A1 | 4/2017 |

OTHER PUBLICATIONS

Sivaraman et al., "Looking at Vehicles on the Road: A Survey of Vision-Based Vehicle Detection, Tracking, and Behavior Analysis", IEEE Transactions on Intelligent Transportation Systems, vol. 14, No. 4, Dec. 2013, (23 pages).

(Continued)

*Primary Examiner* — Thomas Ingram
(74) *Attorney, Agent, or Firm* — Christopher G. Darrow; Darrow Mustafa PC

(57) ABSTRACT

A lane departure detection computing device for a roadside device is disclosed. The computing device is configured to execute instructions stored in a memory to: calculate a first path geometry relating to a first vehicle traveling in a first lane; calculate a second path geometry relating to a second vehicle traveling in a second lane different from the first lane; evaluate coextensive portions of the first path geometry and the second path geometry for parallelism; if the coextensive portions of the first path geometry and the second path geometry evaluated for parallelism are not parallel, determine that one of the first vehicle and the second vehicle is executing a lane departure; and operate a vehicle configured for autonomous operation responsive to the determination that one of the first vehicle and the second vehicle is executing a lane departure.

19 Claims, 6 Drawing Sheets

(51) Int. Cl.
*G01C 21/16* (2006.01)
*B60W 30/095* (2012.01)

(52) U.S. Cl.
CPC ... *B60W 30/18163* (2013.01); *B60W 2550/30* (2013.01); *B60W 2550/304* (2013.01); *G01C 21/165* (2013.01)

(56) References Cited

U.S. PATENT DOCUMENTS

| | | | |
|---|---|---|---|
| 6,889,161 B2 | 5/2005 | Winner et al. | |
| 8,504,233 B1 * | 8/2013 | Ferguson | G06K 9/00798 |
| | | | 340/463 |
| 8,725,342 B2 | 5/2014 | Ferguson et al. | |
| 2007/0043506 A1 | 2/2007 | Mudalige et al. | |
| 2014/0088855 A1 | 3/2014 | Ferguson et al. | |
| 2014/0313335 A1 * | 10/2014 | Koravadi | H04N 7/181 |
| | | | 348/148 |
| 2015/0166062 A1 * | 6/2015 | Johnson | B60W 30/12 |
| | | | 701/41 |

OTHER PUBLICATIONS

Zeisler et al., "A Driving Path Based Target Object Prediction", 2015 IEEE Intelligent Vehicles Symposium (IV), Jun. 28-Jul. 1, 2015, COEX, Seoul Korea, pp. 316-321 (6 pages).

* cited by examiner

SYSTEM AND METHOD FOR DETECTION OF VEHICLE LANE DEPARTURE

CROSS REFERENCE TO RELATED APPLICATIONS

This application is a continuation of, and claims the benefit of, U.S. application Ser. No. 14/997,550, filed on Jan. 17, 2016.

TECHNICAL FIELD

Aspects of the disclosure generally relate to a system including a computing device and one or more sensors in communication with the computing device, the computing device being incorporated in a roadside device, the system being configured to detect movement of one or more vehicles from one lane toward another lane.

BACKGROUND

Each vehicle driving on a roadway must interact with other nearby vehicles. In high-speed, dynamic driving environments, a vehicle may sometimes change lanes without its driver being aware of the location of all the vehicles driving in close proximity to the lane-changing vehicle. This can create potential hazards for vehicles driving close to the lane-changing vehicle, and especially for vehicles driving relatively closely behind the lane-changing vehicle, in an adjacent lane. Thus, it would be beneficial to have a system that detects when vehicles are changing lanes, and which can alert drivers of other, non-lane changing vehicles to the lane change.

Also, there are driving conditions where the actual lanes being used by traffic are different from marked lanes. Such conditions may occur, for example, due to road construction, temporary lane closure, or accident investigation. These actual lanes being traveled by vehicles are still constrained by road geometry, but may differ from lanes marked by conventional lane markers. Furthermore, in some cases, conventional lane markers and road edges may be difficult to detect visually or using camera systems. Thus, it would be beneficial to have a system capable of determining the road geometry and lane paths based on the actual travel paths of vehicles and independent of normal lane boundary markers.

SUMMARY

In one aspect of the embodiments described herein, a computer-implemented method is provided for operating a vehicle configured for autonomous operation. The method includes steps of (1) in a lane departure detection computing device of a roadside device: (a) calculating a first path geometry relating to a first vehicle traveling in a first lane; (b) calculating a second path geometry relating to a second vehicle traveling in a second lane different from the first lane; (c) evaluating coextensive portions of the first path geometry and the second path geometry for parallelism; (d) if the coextensive portions of the first path geometry and the second path geometry evaluated for parallelism are parallel, repeating steps (a)-(d); (e) if the coextensive portions of the first path geometry and the second path geometry evaluated for parallelism are not parallel, determining that one of the first vehicle and the second vehicle is executing a lane departure; and (2) operating the vehicle configured for autonomous operation responsive to the determination that one of the first vehicle and the second vehicle is executing a lane departure.

In another aspect of the embodiments of the described herein, a non-transitory computer readable medium is provided with computer executable instructions stored thereon and executed by a processor to perform a method of operating a vehicle configured for autonomous operation. The method includes steps of (a) calculating a first path geometry relating to a first vehicle traveling in a first lane; (b) calculating a second path geometry relating to a second vehicle traveling in a second lane different from the first lane; (c) evaluating coextensive portions of the first path geometry and the second path geometry for parallelism; (d) if the coextensive portions of the first path geometry and the second path geometry evaluated for parallelism are parallel, repeating steps (a)-(d); (e) if the coextensive portions of the first path geometry and the second path geometry evaluated for parallelism are not parallel, determining that one of the first vehicle and the second vehicle is executing a lane departure; and (f) operating the vehicle configured for autonomous operation responsive to the determination that one of the first vehicle and the second vehicle is executing a lane departure.

In another aspect of the embodiments of the described herein, a lane departure detection computing device for a roadside device is provided. The computing device includes one or more processors for controlling operation of the computing device, and a memory for storing data and program instructions usable by the one or more processors, wherein the one or more processors are configured to execute instructions stored in the memory to: calculate a first path geometry relating to a first vehicle traveling in a first lane; calculate a second path geometry relating to a second vehicle traveling in a second lane different from the first lane; evaluate coextensive portions of the first path geometry and the second path geometry for parallelism; if the coextensive portions of the first path geometry and the second path geometry evaluated for parallelism are not parallel, determine that one of the first vehicle and the second vehicle is executing a lane departure; and operate a vehicle configured for autonomous operation responsive to the determination that one of the first vehicle and the second vehicle is executing a lane departure.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Embodiments of the lane departure detection system described herein enable an ego-vehicle to detect lane changes of vehicles without the use of lane marking information on the road. The system calculates a path geometry of at least two vehicles traveling along a road in adjacent lanes. The system evaluates the most recent portions of the path geometries of the two vehicles for parallelism. If the evaluated portions of the paths are deemed to be parallel, it is deemed unlikely that both vehicles are changing lanes simultaneously. It is also deemed unlikely that any one of the two vehicles was changing lanes. Therefore, the system determines that no lane change is occurring. However, if the If the evaluated portions of the paths are deemed to be non-parallel, the system determines that the paths followed by the associated vehicles are no longer parallel. In this case, it the system assumes that one of the vehicles is changing lanes. In a particular application, the system may be used to detect a lane change of a vehicle driving ahead of the ego vehicle in an adjacent lane. This enables a driver to take appropriate responsive action and also enables an automated driving system in the ego-vehicle to plan a route of the ego-vehicle. Sensors of the lane departure detection system and/or a computing system incorporating the lane departure detection capabilities described herein may also be located in a roadside device configured for detecting lane changes by vehicles driving along a section of road.

Figure 1:
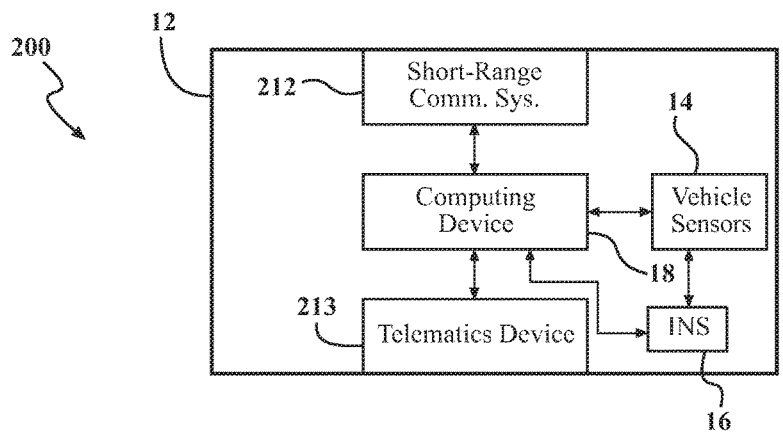
FIG. 1 is a block diagram of one embodiment of a vehicle system for detecting lane departures or lane changes of vehicles surrounding an ego vehicle, without the use of lane marking information.

FIG. 1 is a block diagram of one embodiment of a vehicle system 200 for detecting lane departures or lane changes of vehicles surrounding an ego vehicle 12, without the use of lane marking information. System 200 is shown incorporated into an ego vehicle 12 and includes a known inertial navigation system (INS) 16, vehicle sensors 14, and a computing device 18 in operative communication with sensors 14 and INS 16.

INS 16 may also be configured for monitoring and storing in a memory a path of the vehicle 12 along a road. As is known in the pertinent art, the INS is configured for using vehicle sensor data to continuously calculate (by "dead reckoning") the position, direction, velocity and acceleration of the vehicle 12 without the need of external references. Thus, the output of the INS 16 includes the coordinates (x, y, z, t) of the vehicle 11 in 3-D space and time t, as well as its instantaneous speed (v) and acceleration (a). The INS may include (or may be in operative communication with) any sensors 14 (such as motion sensors (for example, accelerometers), rotation sensors (for example, gyroscopes), etc.) suitable for the purposes described herein. For example, INS may include sensors configured for detecting the vehicle's roll rate, yaw rate, pitch rate, longitudinal acceleration, lateral acceleration, vertical acceleration and other vehicle operational parameters. The terms "continuous" or "continuously" and other similar terms as used herein with reference to the calculation, processing, receiving, evaluation, comparing and approximation of various parameters, are understood to signify that these activities occur at the most rapid rate possible within the limitations of the system or component capabilities.

Vehicle sensors 14 are configured to measure various vehicle parameters and to provide vehicle operational information to other vehicle components, for example INS 16 and computing device 18. For the purposes described herein, certain sensors are configured for detecting the positions of any surrounding vehicles in relation to the position of the ego vehicle (i.e., the vehicle in which the sensors are installed). Vehicle sensors 14 may include any sensors suitable for providing the data of information usable for the purposes described herein. Examples (not shown) of sensors that may be incorporated into the vehicle 12 include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

As stated previously, certain vehicle sensors may be incorporated into INS 16 or into other vehicle components or modules, and some sensors may be mounted on the vehicle in a stand-alone configuration. The data or information provided by any of sensors 14 may be integrated or combined with other data or information in a sensor fusion step using, for example, a suitable Kalman filter (not shown). Also, if required, data or information transmitted within or to vehicle 12 may be processed in an A/D converter, D/A converter or other processing means (not shown) for example, prior to further processing or other operations performed on the information by other vehicle elements or systems.

Figure 2:
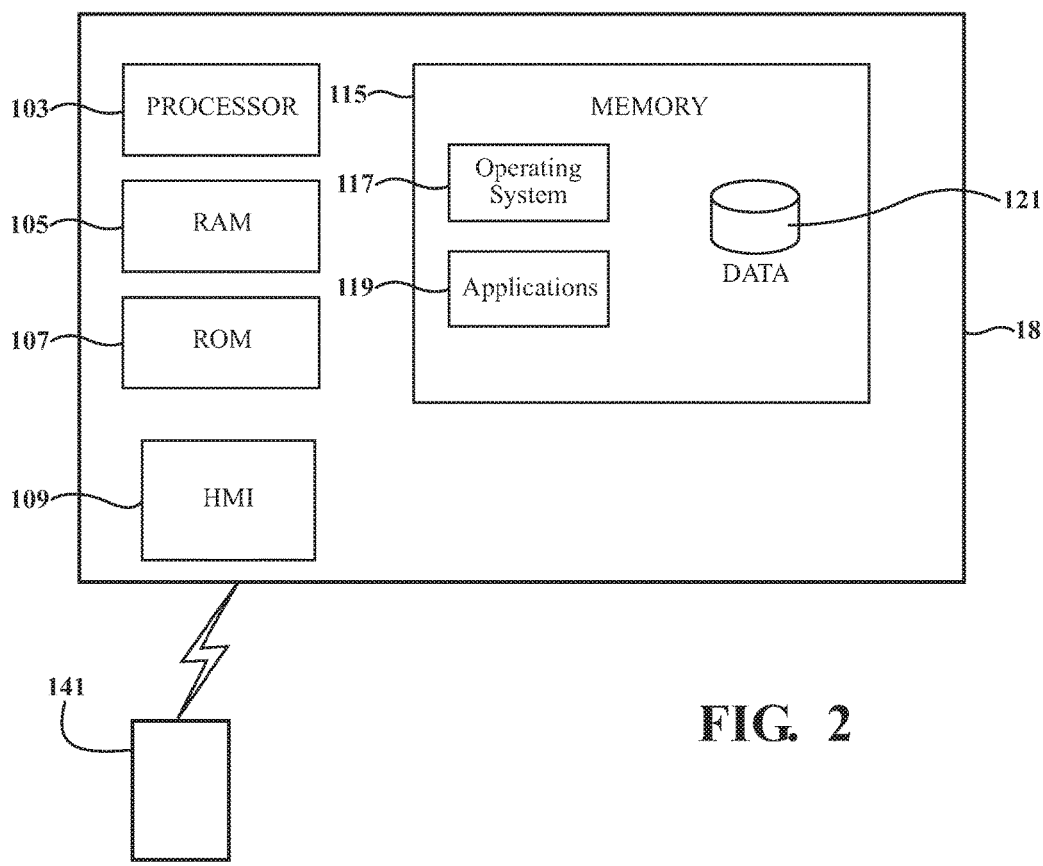
FIG. 2 is a block diagram of a computing device incorporated into the lane departure detection system of FIG. 1.
Figure 3:
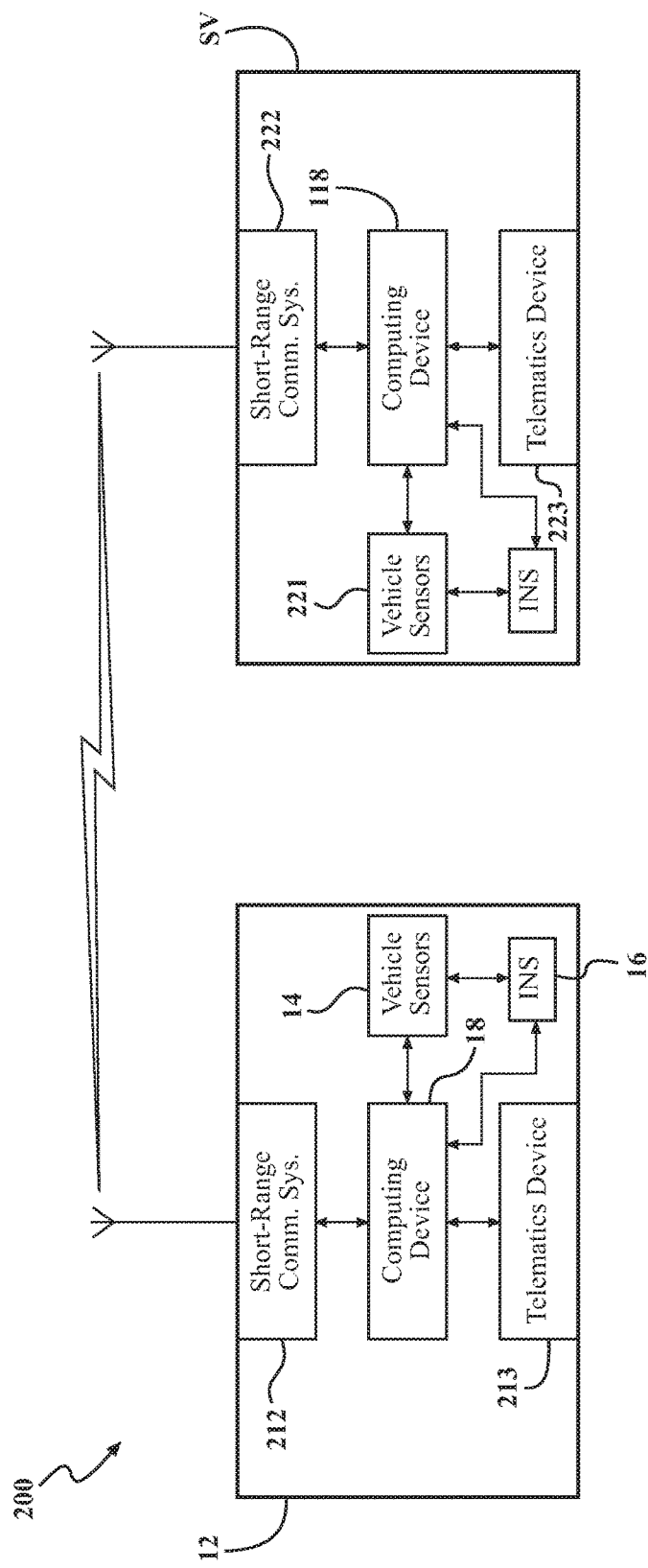
FIG. 3 is a block diagram showing of an ego-vehicle similar to that shown in FIG. 1, in communication with one embodiment of a surrounding vehicle.

FIG. 2 illustrates a block diagram of a computing device 18 in lane departure detection system 200 that may be used according to one or more illustrative embodiments of the disclosure. The lane departure detection computing device 18 may have one or more processors 103 for controlling overall operation of the device 18 and its associated components, including RAM 105, ROM 107, input/output module or HMI (human machine interface) 109, and memory 115. The computing device 18 may be configured for transmitting and receiving vehicle-to-vehicle (V2V) communications, and for collecting and/or receiving vehicle sensor data and other information.

The computing device 18 is also configured for continuously receiving ego vehicle position, direction, velocity and acceleration information from the INS, for storing the ego-vehicle information in memory, and for continuously processing the ego-vehicle information to generate and/or maintain a digital representation of the ego vehicle path geometry, as described herein. The computing device 18 is also configured for continuously receiving and storing sensor information relating to the positions of any surrounding vehicles (SV's) with respect to the ego-vehicle over time, and for continuously calculating, using the surrounding vehicle position information, the velocities and accelerations of the surrounding vehicles with respect to the ego vehicle over time. The computing device 18 is also configured for continuously processing the surrounding vehicle information as described herein to generate digital representations of the path geometries of the surrounding vehicles in relation to the path geometry of the ego-vehicle. The computing device 18 is also configured for continuously comparing the path geometries of the surrounding vehicles to each other and also to the path geometry of the ego vehicle as described herein, and for using the comparisons to detect lane departures or changes of a surrounding vehicle. The computing device 18 may also be configured for communication with various vehicle-based devices (e.g., on-board vehicle computers, short-range vehicle communication systems, telematics devices), mobile communication devices (e.g., mobile phones, portable computing devices, and the like), roadside stations or devices and/or other remote systems (such as GPS systems).

Software may be stored within memory 115 and/or storage to provide instructions to processor 103 for enabling device 18 to perform various functions. For example, memory 115 may store software used by the device 18, such as an operating system 117, application programs 119, and an associated internal database 121. Processor 103 and its associated components may allow the lane departure detection system 200 to execute a series of computer-readable instructions to perform the functions described herein.

An Input/Output (I/O) or HMI (human-machine interface) 109 may include a microphone, keypad, touch screen, and/or stylus through which a user of the computing device 18 may provide input, and may also include one or more of a speaker for providing audio output and a video display device for providing textual, audiovisual and/or graphical output. HMI 109 may also be configured for providing output to mobile communication devices 141 (e.g., mobile phones, portable computing devices, and the like).

FIG. 2 is a block diagram showing of an ego-vehicle 12 similar to that shown in FIG. 1, in communication with one embodiment of a surrounding vehicle SV. Each component shown in FIG. 2 may be implemented in hardware, software, or a combination of the two. Vehicle SV may include a computing device 118 similar computing device 18 described previously. A Global Positioning System (GPS), locational sensors positioned inside the vehicles 12 and SV, and/or locational sensors or devices external to the vehicles 12 and SV may be used determine vehicle route, lane position, vehicle movement and other vehicle position/location data. Additionally, the vehicle position and movement information and/or other information may be transmitted via telematics devices 213 and 223 to other vehicles or to one or more remote systems or computing devices (not shown in FIG. 2).

Vehicle 12 may also incorporate a short-range communication system 212 configured to transmit vehicle operational information and other information to surrounding vehicles and/or to receive vehicle operational information and/or other information from surrounding vehicles. The vehicle operational information may include information relating to vehicle position and movement necessary for performing the functions described herein. In some examples, communication system 212 may use dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 212 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system 212 and other vehicles 222 may be sent via DSRC, Bluetooth, satellite, GSM infrared, IEEE 802.11, WiMAX, RFID, and/or any suitable wireless communication media, standards, and protocols.

In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers). The range of V2V communications between vehicle communication system 212 and other vehicles may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side devices. Certain V2V communication systems may continuously broadcast vehicle operational information from a surrounding vehicle or from any infrastructure device capable of transmitting the information to an ego-vehicle.

A vehicle communication system 212 may first detect nearby vehicles and/or infrastructure and receiving devices, and may initialize communication with each by performing a handshaking transaction before beginning to receive vehicle operational information. New of additional surrounding vehicles may be detected in the ego-vehicle by any of a variety of methods, for example, by radar or by reception by the ego-vehicle (from a surrounding vehicle configured for V2V communication with the ego-vehicle) of vehicle operational information from the new vehicle.

Figure 4:
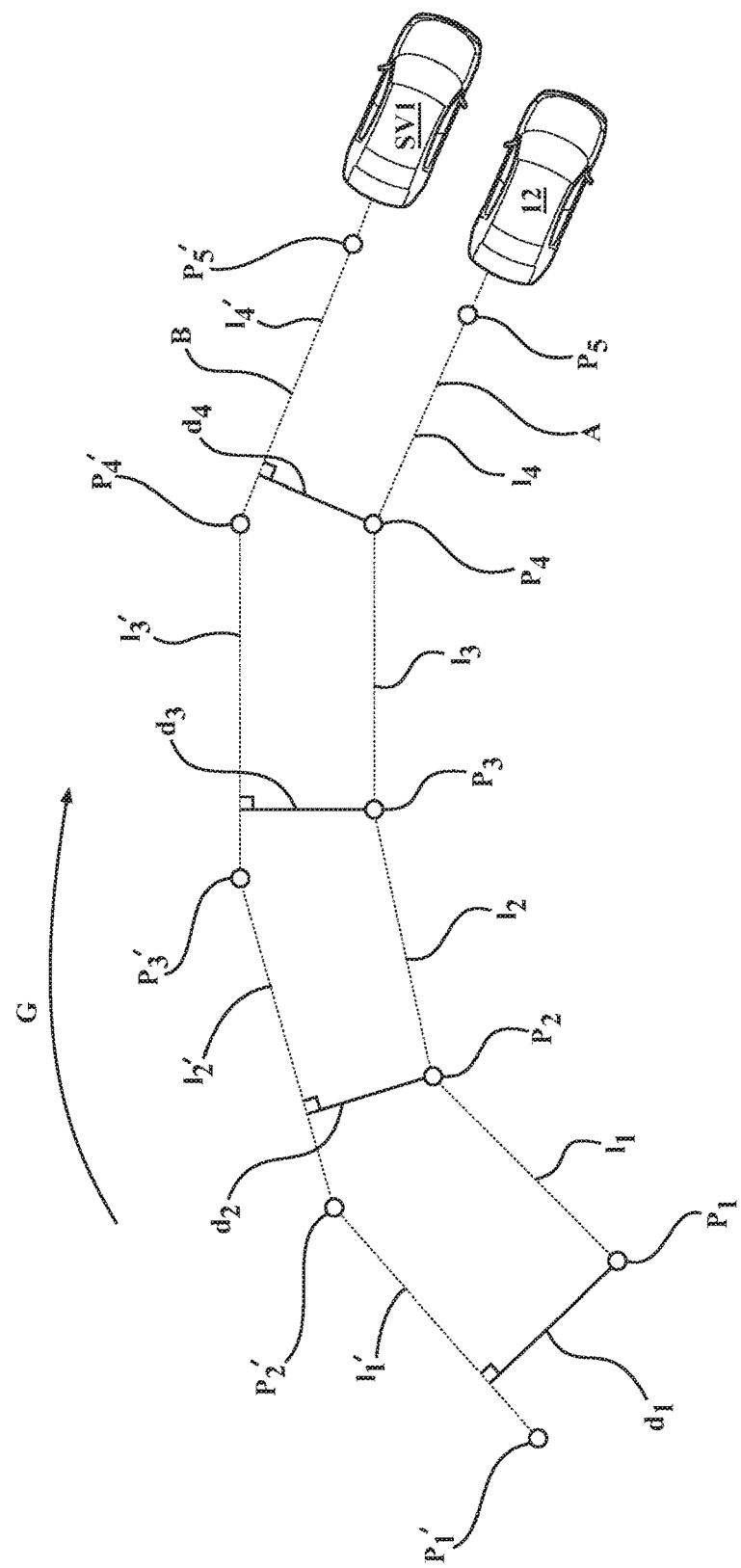
FIG. 4 is a schematic diagram illustrating a computer-implemented method of generating a path geometry of an ego vehicle and a surrounding vehicle.

For purposes of the following discussion of FIG. 4, the ego-vehicle path is considered to be path A, while path B represents the path of a surrounding vehicle traveling in proximity to the ego-vehicle.

FIG. 4 illustrates a computer-implemented method of generating a representation of a path geometry A of an ego vehicle 12. On a continuous basis, during movement of the ego vehicle 12 on a road in direction G, the position, direction, velocity and acceleration of the ego vehicle 12 are calculated by the INS 16 using sensor readings taken at successive points in time $t_1$, $t_2$, $t_3$, etc. For example, the position of the ego-vehicle 12 at time $t_1$ is shown as P1, which represents the x, y, and z coordinates of the ego-vehicle at a time $t_1$. The values of these parameters are passed to computing device 18. During movement of the vehicle, the computing device 18 processes the positional data to connect time-successive calculated vehicle positions $P_i$ with line segments $l_i$ as shown in FIG. 4. The aggregate of the connected line segments $l_i$ are used, in one embodiment, to define the vehicle path geometry in terms of an up-to-date representation of a positional or path history of the vehicle.

In embodiments described herein, for purposes of tracking the vehicle paths as accurately as possible, it is desirable that the sensor data for all vehicles be acquired at least a minimum predetermined sampling rate, to help minimize errors in the path geometry approximation caused, for example, by using one or more straight line or polynomial segments to approximate a curved portion of the path geometry. In one embodiment, the vehicle path is approximated by a string of linear segments connecting the successive vehicle positions. For a path approximated by a connected string of linear segments, the minimum predetermined sampling rate may be determined by specifying a maximum permitted distance between sensor measurement locations (i.e., a maximum desirable length of a line segment $l_i$ connecting any two successive vehicle positions $P_i$ and $P_{i+1}$), according to the relationship:

$$\text{Max } |l_i| < L_{max} \text{ for all } i \text{ in } \{1, 2, 3, 4, \text{etc.}\} \quad (1)$$

where Max $|l_i|$ is the maximum absolute value of the length of the line segment $l_i$ and $L_{max}$ is a parameter which may be determined according to the requirements of a given application. Thus, the sensor sampling rate is determined such that the maximum length of a line segment $l_i$ connecting successive measured vehicle locations $P_i$ and $P_{i+1}$ is always below $L_{max}$. In a particular embodiment, $L_{max}$ is set to the greater of either 1.5 meters or 0.2 (v) meters, where v is the speed of the vehicle in meters/second. In other embodiments, the path geometry may be approximated in a known manner from the successive measured vehicle locations using spline interpolation or polynomial interpolation.

In addition, for more accurate results, it is also desirable that the coextensive path history portions being evaluated for parallelism be spaced apart at least a minimum distance determined according to the following relationship:

$$D_{min} < \max|d_i| < D_{max} \text{ for all } i \text{ in } \{1, 2, 3, 4, \text{etc.}\} \quad (2)$$

where $D_{min}$=a minimum spacing between the paths, $D_{max}$=a maximum spacing between the paths, and max $|d_i|$ is an absolute measured value between the paths. For the purposes described herein, two paths are considered to be coextensive up to the most recent locations along the paths where they can be connected by a line segment $d_i$ extending perpendicular to each path.

In addition, for more accurate results, it is also desirable that the coextensive portions of the vehicle path histories being evaluated for parallelism should be of at least a predetermined minimum length. In one embodiment, the portion $L_{eval}$ of each total vehicle path length that is evaluated for parallelism satisfies the following relationship:

$$L_{eval} > L_{min} \quad (3)$$

where $L_{min}$ is a parameter which may be determined according to the requirements of a given application. In a particular embodiment, $L_{min}=5\ L_{max}$. Thus, in the example shown in FIG. 4, if parallelism of path A to path B is evaluated over the portion of path A including line segments $l_1$-$l_4$, then the above condition is met where:

$$L_{eval}=(|l_1|+|l_2|+|l_3|+|l_4|) > L_{min} \quad (4)$$

The path histories of any surrounding vehicles SV are determined in a manner similar to that used for the path history of ego-vehicle 12. FIG. 4 illustrates one method of calculating a path history B of a surrounding vehicle SV1 with respect to the ego vehicle 12. On a continuous basis, ego-vehicle sensors 14 detect the position of surrounding vehicle SV1 with respect to ego-vehicle 12. FIG. 4 shows the successive positions $P_i'$ of vehicle SV1 in relation to ego-vehicle 12 based on sensor readings taken at successive points in time $t_1'$, $t_2'$, $t_3'$, etc. For example, the position of SV1 at time $t_1'$ is shown as $P_1'$, which represents the x, y, and z coordinates of vehicle SV1 with respect to ego-vehicle 12 based on sensor readings taken at a time $t_1'$.

The SV1 positional data from sensors 14 is passed to computing device 18, which stores the positional data. The data is also processed in a manner similar to that previously described for ego-vehicle 12, to generate a digital representation of the path history B of vehicle SV1 in relation to the path history of the ego vehicle. Computing device 18 may also process the SV1 positional data to calculate associated velocities and accelerations of SV1 with respect to the ego vehicle. This procedure may be executed for any surrounding vehicle.

In a particular embodiment, data acquisition for both the ego-vehicle and one or more of the surrounding vehicle is coordinated and time-correlated, so that the sensor readings needed for path determinations of the ego-vehicle and the one or more surrounding vehicle(s) are taken at the same points in time.

A vehicle path may be calculated using any suitable non-varying feature of the vehicle as a reference. For example, in an ego-vehicle using a radar detection system and following behind a surrounding vehicle, the reference on the surrounding vehicle may be taken as a centerline of an envelope defined by opposite lateral sides of the vehicle. Alternatively, the reference may be taken as a side (or a feature of a side) of the vehicle. Location points P used for generating the vehicle path approximations are then assumed to lie on the vehicle measurement reference location.

After the path histories of the ego vehicle and vehicle SV1 have been determined, the path histories may be compared and evaluated for parallelism using the criteria set forth herein. As the vehicle path histories calculated by the computing device are continuous and up-to-date representations of the various vehicle paths, the results of the path parallelism assessments are used to detect lane changes by the various surrounding vehicles. That is, when the paths of any surrounding vehicles traveling adjacent the ego-vehicle or side-by-side with each other are no longer deemed to be parallel according to the criteria set forth herein, computing device 18 sends a warning to the ego-vehicle alerting its occupants that one of the surrounding vehicles is executing a lane change.

FIG. 4 shows one example of a method for evaluating parallelism of any two given path histories A and B. Distances $d_i$ represent minimum distances between path A and path B, measured from corresponding locations $P_i$ along line segments representing path A where positional sensor readings were taken by the INS. For example, $d_1$ is a minimum distance between path A and path B, measured from a first location $P_1$ along a line segment $l_1$ of path A where positional sensor readings were taken by the INS. Referring to FIG. 4, the computing device 18 calculates a minimum distance $d_1$. The computing device 18 also calculates a minimum distance $d_4$ between path A and path B, measured from a second location $P_4$ along path A where positional sensor readings were taken by the INS. The minimum distances between the vehicle paths may be measured along coextensive portions of the paths for which the most recent or latest data is available, in order to detect a lane departure as soon as possible. Also, it will be noted that the spacing between the paths A and B may be calculated by measuring minimum distances from path A to path B or from path B to path A.

As stated previously, the minimum lengths $L_{eval}$ of the portions of the paths A and B over which parallelism is measured should meet the criterion $L_{eval} > L_{min}$ as previously described. Thus, in a case where parallelism is measured as described above, the portion $L_{eval}=l_1+l_2+l_3+l_4$ of path A along which parallelism is measured would need to meet the criterion $L_{eval}=(|l_1|+|l_2|+|l_3|+|l_4|) > L_{min}$. The computing device then calculates the value of $|(d_4-d_1)|$. The computing device then evaluates the value $|(d_4-d_1)|$ in accordance with the relationship:

$$\text{Max } |(d_k-d_i)| < A_{max} \text{ for all } i,k \text{ in } \{1, 2, 3, 4, \text{etc.}\} \quad (5)$$

where $A_{max}$ is a parameter which may be determined according to the requirements of a given application. In a particular embodiment, $A_{max}$=15 centimeters. In another particular embodiment, $A_{max}$=30 centimeters. In yet another particular embodiment, $A_{max}$=50 centimeters.

If the absolute value of the difference in the minimum spacing between the vehicle paths A and B at locations $P_1$ to $P_4$ varies by less than $A_{max}$ (i.e., if the distance between the paths A and B remains relatively constant throughout the most recent portions of the vehicles' paths), then it is deemed unlikely that both vehicles are changing lanes simultaneously. It is also deemed unlikely that any one of the two vehicles was changing lanes. Therefore, the computing device 18 determines that no lane change is occurring. However, if the absolute value of the difference in the spacing between the vehicle paths A and B at locations $P_1$ to $P_4$ varies by $A_{max}$ or more, the computing device determines that the paths A and B followed by the associated vehicles are no longer parallel. In this case, it the computing device 18 assumes that one of the vehicles is changing lanes. Thus, the parameter $A_{max}$ defines a zone of permissible variation of the spacing between paths A and B. If it is determined that one of the vehicles is changing lanes, a suitable warning or alert can be transmitted to the ego-vehicle occupants via HMI 109.

Figure 5:
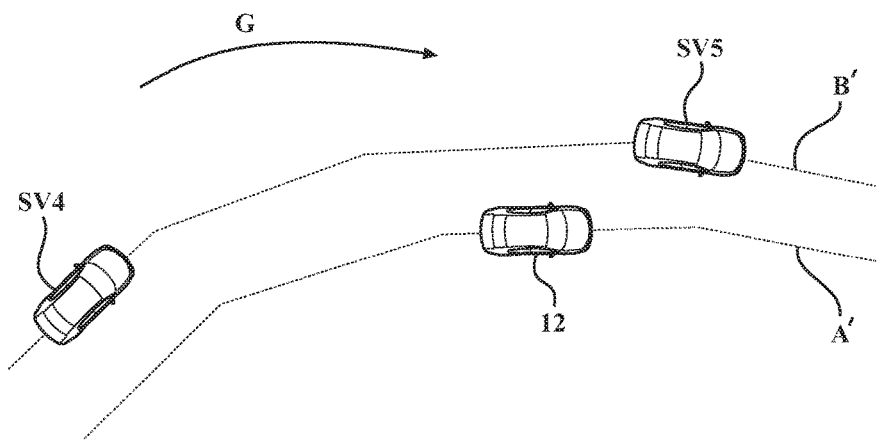
FIG. 5 is a schematic diagram showing additional aspects of the system embodiments described herein.

FIG. 5 shows additional aspects of the system embodiments described herein. Because the lane departure detection system 200 is evaluating parallelism of estimated paths of the ego-vehicle and/or surrounding vehicles, a lane departure may be detected for any surrounding vehicle, traveling either in front of or behind the ego-vehicle, assuming that the positional and movement information necessary for calculating the vehicle path is available to the ego-vehicle computing device 18.

In FIG. 5 for example, the lane departure detection system 200 may detect a lane departure of a surrounding vehicle SV4 traveling behind ego-vehicle 12 in an adjacent lane, based on a determination of the spacing between the estimated vehicle paths A' and B', as previously described. Also, the lane departure detection system 200 may detect a lane departure of a surrounding vehicle SV5 traveling ahead of ego-vehicle 12 in an adjacent lane, based on a determination of the spacing between the estimated vehicle paths A' and B', as previously described.

Figure 6:
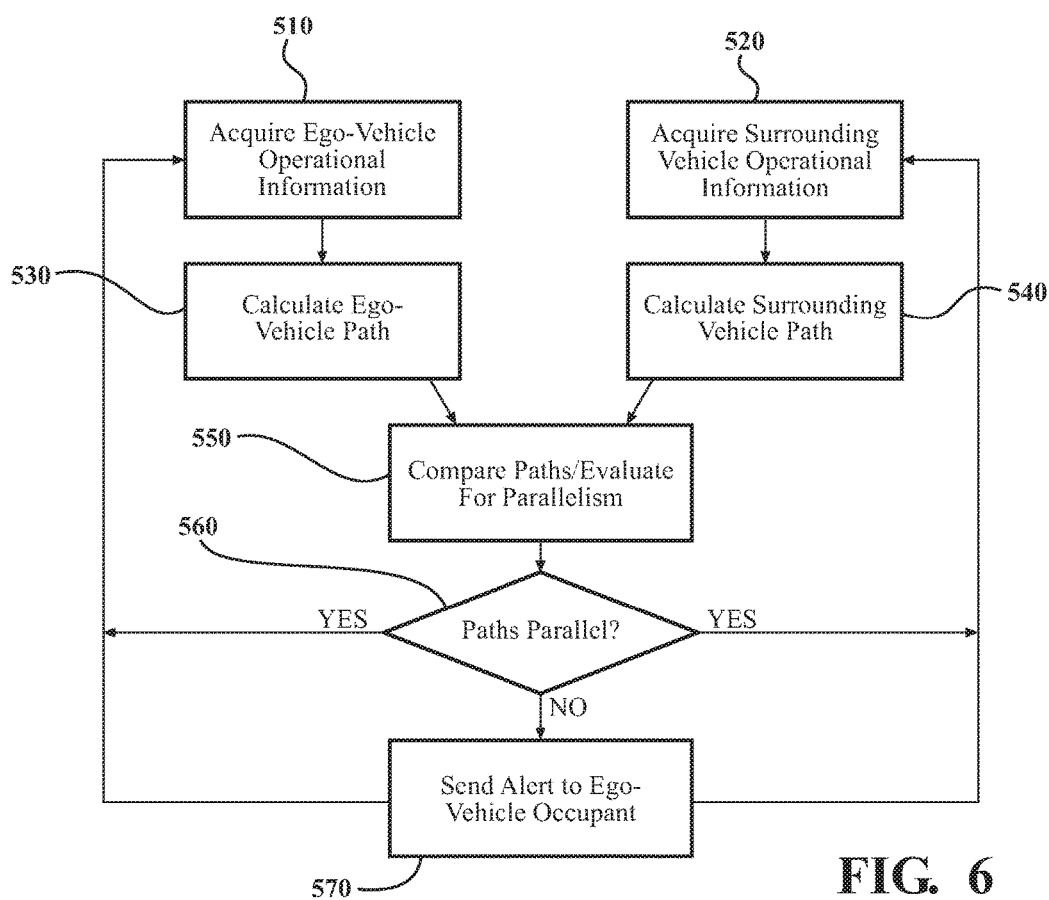
FIG. 6 is a flow diagram illustrating a method for detecting a lane departure of a vehicle traveling in a lane adjacent an ego-vehicle, in a scenario such as shown in FIG. 4 and FIG. 5.

FIG. 6 is a flow diagram illustrating a method for detecting a lane departure of a vehicle traveling in a lane adjacent an ego-vehicle, in a scenario such as shown in FIG. 4 or FIG. 5.

In block 510, computing device 18 acquires ego vehicle operational information needed to calculate the ego vehicle path. In block 520, computing device 18 acquires surrounding vehicle operational information needed to calculate the surrounding vehicle path. This may be done for one or more surrounding vehicles simultaneously. Also, the information acquisition in blocks 510 and 520 may be executed simultaneously. In block 530, using the ego-vehicle operational information, computing device 18 calculates the ego-vehicle path. In block 540, using the surrounding vehicle operational information, computing device 18 calculates the path(s) of the surrounding vehicle(s). The calculations in blocks 530 and 540 may be done simultaneously.

In step 550, computing device 18 compares the various vehicle paths and evaluates the paths for parallelism. In block 560, if it is determined that the vehicle paths being evaluated do not satisfy the parallelism criterion set for the relation (5), a warning or alert is transmitted to the ego-vehicle occupant(s). Then acquisition of operational information from the ego-vehicle and surrounding vehicles continues. If it is determined that the vehicle paths being evaluated satisfy the parallelism criterion set for the relation (5), acquisition of operational information from the ego-vehicle and surrounding vehicles continues.

Figure 7:
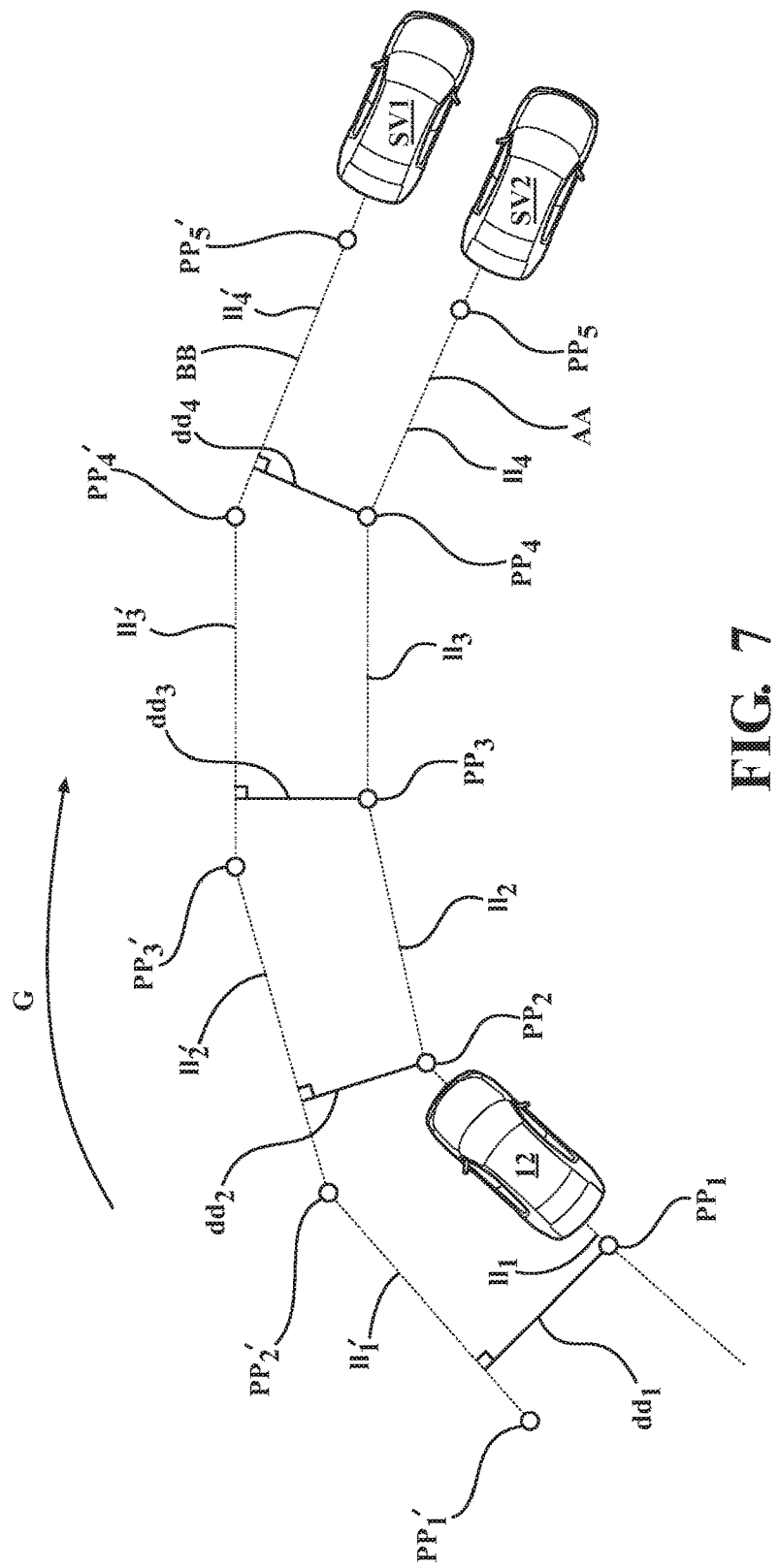
FIG. 7 is a schematic diagram illustrating a computer-implemented method of generating path geometries of surrounding vehicles traveling in front of an ego-vehicle.

FIG. 7 shows another aspect of the detection system embodiments described herein. FIG. 7 shows a schematic view similar to the view shown in FIG. 4, illustrating two vehicle paths AA and BB. In FIG. 7, the ego-vehicle lane departure detection system 200 is used to detect a lane change of one of two surrounding vehicles SV1 and SV2 traveling side-by-side or adjacent each other, with the ego vehicle 12 traveling along the same lane or portion of road as SV2 and behind SV2. Paths AA and BB represent the paths of the two surrounding vehicles SV1 and SV2. In this embodiment, the ego-vehicle computing device 18 receives sensor information from (or relating to) both of surrounding vehicles SV1 and SV2 and calculates the paths of these surrounding vehicles in relation to the ego-vehicle, in the manner previously described.

As the ego-vehicle 12 and the surrounding vehicles SV1 and SV2 travel along the road in direction G, ego-vehicle sensors continuously detect the positions of the surrounding vehicle at various points along the road in accordance with the ego-vehicle sensor sampling rates. FIG. 7 shows successive positions $PP_i'$ of vehicle SV1 in relation to ego-vehicle 12 based on sensor readings taken at successive points in time $t_1'$, $t_2'$, $t_3'$, etc. For example, the position of the vehicle SV1 at time $t_1'$ is shown as $PP_1'$, which represents the x, y, and z coordinates of vehicle SV1 with respect to ego-vehicle 12 based on ego-vehicle sensor readings taken at a time $t_1'$. Similarly, FIG. 7 also shows successive positions $PP_i$ of vehicle SV2 in relation to ego-vehicle 12 based on sensor readings taken at successive points in time $t_1$, $t_2$, $t_3$, etc. For example, the position of the vehicle SV2 at time $t_1$ is shown as $PP_1$, which represents the x, y, and z coordinates of vehicle SV2 with respect to ego-vehicle 12 based on ego-vehicle sensor readings taken at a time $t_1$. As described with regard to FIG. 4, during movement of the vehicle SV2, the computing device 18 may process the vehicle positional data to connect time-successive calculated vehicle positions $PP_i$ with line segments $ll_i$ as shown in FIG. 7. The aggregate of the connected line segments $ll_i$ (i.e., segments $ll_1$, $ll_2$, $ll_3$ and $ll_4$ as shown) is used, in one embodiment, to define the vehicle path geometry (i.e., path AA) in terms of an up-to-date representation of a positional or path history of the vehicle. Also, during movement of the vehicle SV1, the computing device 18 may process the vehicle positional data to connect time-successive calculated vehicle positions $PP_i'$ with line segments $ll_i'$ as shown in FIG. 7. The aggregate of the connected line segments $ll_i'$ (i.e., segments $ll_1'$, $ll_2'$, $ll_3'$ and $ll_4'$ as shown) is used, in one embodiment, to define the vehicle path geometry (i.e., path BB) in terms of an up-to-date representation of a positional or path history of the vehicle.

Also, similar to the embodiment shown in FIG. 4, distances $dd_i$ represent minimum distances between path AA and path BB, measured from corresponding locations $PP_i$ along line segments representing path AA where sensor readings on the position of the vehicle SV2 were taken. For example, $dd_1$ is a minimum distance between path AA and path BB, measured from a first location $PP_1$ along a line segment $ll_1$ of path AA where sensor readings on the position of the vehicle SV2 were taken.

On a continuous basis, the successive positions of each of surrounding vehicles SV1 and SV2 with respect to the ego-vehicle are processed to generate representations of the paths AA and BB of the surrounding vehicles. Successive sensor measurement locations relating to each of vehicles SV1 and SV2 are connected with straight line segments as previously described to generate vehicle path approximations.

Parallelism of paths AA and BB are evaluated according to the criteria and in a manner similar to that described previously. It will be noted that the spacing between the paths AA and BB may be calculated by measuring minimum distances from path AA to path BB or from path BB to path AA. The minimum distances between the paths AA and BB continue to be estimated as previously described, as the vehicle SV1 and SV2 travel along the road ahead of ego-vehicle 12. The minimum distances between the paths are measured along the coextensive portions of the paths for which the most recent or latest data is available, in order to detect a lane departure as soon as possible.

If the absolute value of the of the difference in the minimum spacing between the vehicle paths A and B along the most recent portions of the vehicle paths varies by more than $A_{max}$ as set forth in relation (5) above, the computing device determines that the paths AA and BB followed by the associated vehicles are no longer parallel. In this case, it the computing device 18 assumes that one of the vehicles SV1 and SV2 is changing lanes. The vehicles then may be labeled as (or given the status of) "lane changing". However, if the absolute value of the variation of the distance between the vehicle paths A and B as calculated above along the most recent portions of the vehicle paths does not equal or exceed $A_{max}$ as set forth in relation (5) above, then it is deemed unlikely that both vehicles are changing lanes simultaneously and also unlikely that any one of the two vehicles is changing lanes. In this case, the computing device determines that the paths AA and BB followed by the associated vehicles are still parallel, and the vehicles may be labeled as (or given the status of) "non-lane changing".

Thus, the lane departure detection method illustrated in FIG. 7 includes steps of locating a pair of vehicles SV1 and SV2 traveling in adjacent lanes and side-by-side, and monitoring, along a portion of the vehicles' paths AA and BB including the most recent or latest known positions of the vehicles, the distance between the vehicles. If the vehicle separation distance remains relatively constant over the latest portion of the vehicles' paths, then it is deemed unlikely that both vehicles are changing lanes simultaneously and also unlikely that any one of the two vehicles is changing lanes. In this case, the vehicles may be labeled as (or given the status of) "non-lane changing". Alternatively, if the vehicle separation distance varies by more than a predetermined amount over the latest portion of the vehicles' paths, then it is determined that one of the vehicles is changing lanes. In this case, the vehicles may be labeled as (or given the status of) "lane changing".

Figure 8:
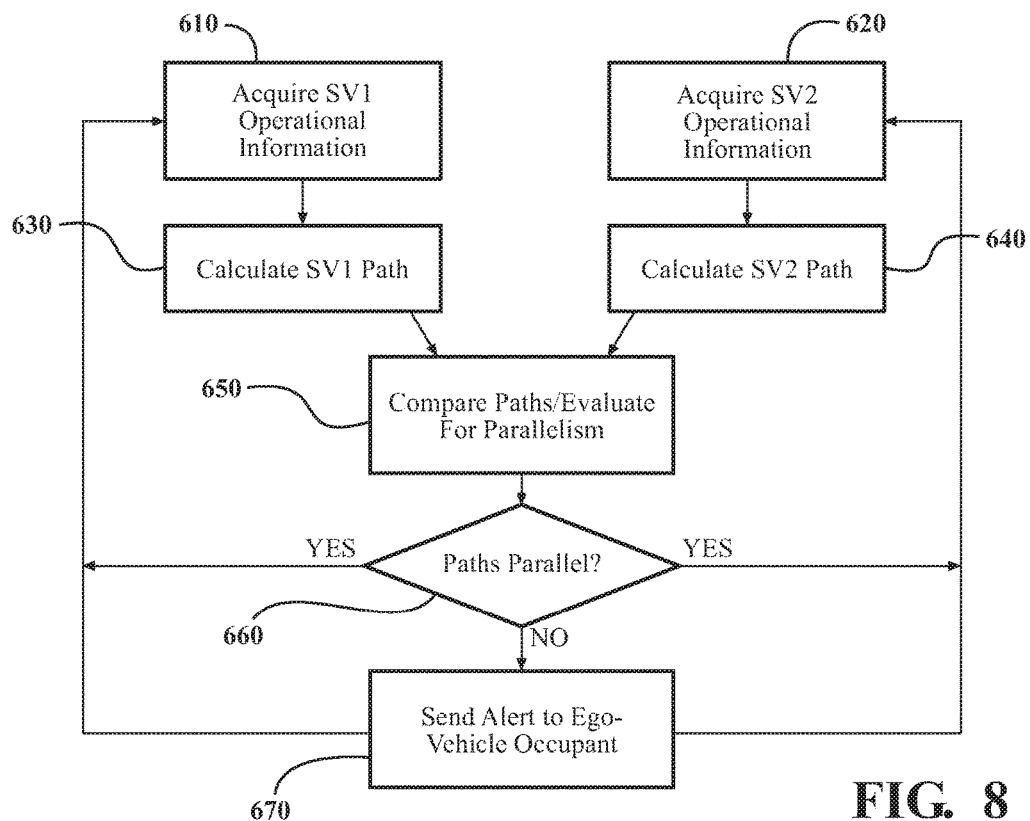
FIG. 8 is a flow diagram illustrating a method for detecting a lane departure of one of two surrounding vehicles traveling ahead of the ego-vehicle, in a scenario such as shown in FIG. 7.

FIG. 8 is a flow diagram illustrating a method for detecting a lane departure of one of two surrounding vehicles traveling ahead of the ego-vehicle, in a scenario such as shown in FIG. 7. In block 610, computing device 18 acquires surrounding operational information for vehicle SV1 needed to calculate the surrounding vehicle path. In block 620, computing device 18 acquires surrounding operational information for vehicle SV2 needed to calculate the surrounding vehicle path. Also, the information acquisition in blocks 610 and 620 may be executed simultaneously. In block 630, using the ego-vehicle operational information, computing device 18 calculates the ego-vehicle path. In block 640, using the surrounding vehicle operational information, computing device 18 calculates the path(s) of the surrounding vehicle(s). The calculations in blocks 630 and 640 may be done simultaneously. In step 650, computing device 18 compares the various vehicle paths and evaluates the paths for parallelism. In block 660, if it is determined that the vehicle paths being evaluated do not satisfy the parallelism criterion set for the relation (5), a warning or alert is transmitted to the ego-vehicle occupant(s). Then acquisition of operational information from the surrounding vehicles continues. If it is determined that the vehicle paths being evaluated satisfy the parallelism criterion set for the relation (5), acquisition of operational information from the surrounding vehicles continues.

In another example, the system can provide information to the driver which might indicate that the surrounding lane-changing vehicle is trying to avoid an obstacle or a slow moving vehicle and prepare the driver to encounter such a situation. In addition, in cases where the ego-vehicle receives position and movement information from a vehicle driving ahead of the ego-vehicle in the same lane, the received information provides the ego-vehicle driver with a view of the lane path and road conditions ahead of the ego-vehicle.

In the manner described herein, the embodiments of the lane departure detection system enable the detection of lane changes of surrounding vehicles without the use of lane markers. In addition, the system enables detection of a vehicle lane by continuously approximating the path of the vehicle and also the path of one other vehicle which is used for comparison purposes. The most recent coextensive portions of the vehicle paths are continuously evaluated for parallelism, as described above.

In addition, it may be seen that the path geometries of vehicles which are not changing lanes may serve as confirmations or independent indications of the paths of actual or current lanes in which vehicles are traveling. This is helpful in cases where the actual lanes are different from marked lanes (i.e., in cases where the actual travel lanes differ from marked lanes due, for example, to construction, temporary lane closure, or accident investigation). The path geometries of vehicles which are not changing lanes may also indicate the road geometry where road-edges or lane markers cannot be seen or sensed visually or using a camera system, and in cases where the projected vehicle paths are received on a GPS receiver in the form of route information.

In another aspect, in a vehicle configured for a degree of autonomous operation, the computing device may be configured to operate the ego-vehicle in response to the detection of a surrounding vehicle lane change. For example, referring to FIG. 5, if ego-vehicle 12 detects that vehicle SV5 is changing lanes, additional sensors may determine that vehicle SV5 is moving toward ego-vehicle path A'. The ego-vehicle computing device 18 may be configured to execute any of a variety of commands designed to increase occupant safety in such cases. For example, the ego-vehicle 18 may slow to increase the spacing between the ego-vehicle and SV5. Thus, detection of surrounding vehicle lane changes using the system described herein can aid in planning the future path of an ego-vehicle and also help estimate geometry of the lane on the road.

In another aspect of the embodiments described herein, the surrounding vehicle operational information needed for calculation of the vehicle paths may be obtained from sources other than the ego vehicle sensors. For example, the information may be transmitted to the ego-vehicle from roadside devices, a GPS system, or from the surrounding vehicle itself using a V2V or short-range vehicle communication system.

Figure 9:
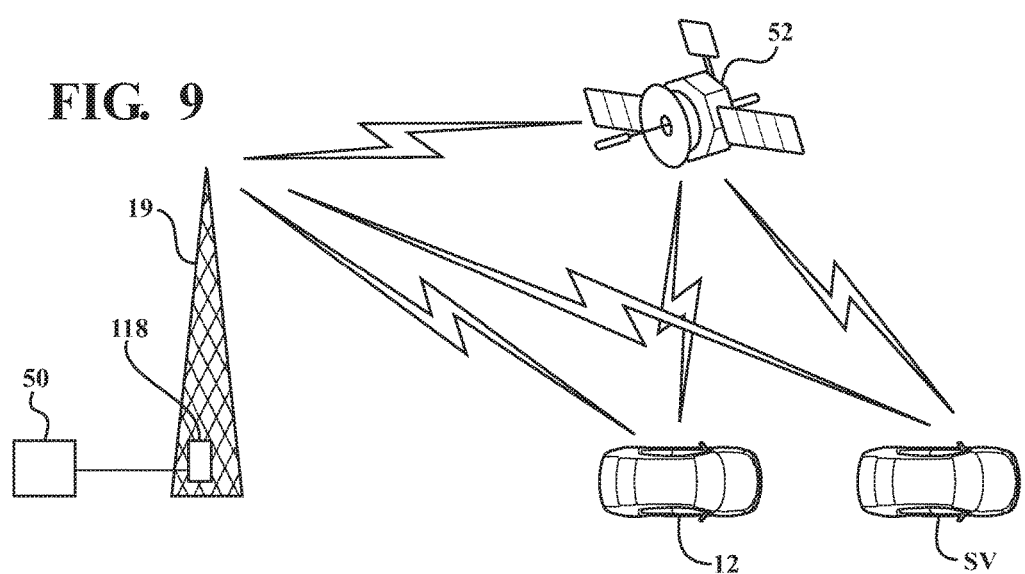
FIG. 9 is a schematic diagram showing various possible alternative implementations of the lane departure detection system.

FIG. 9 shows various possible alternative implementations of the lane departure detection system.

Referring to FIG. 9, in another embodiment, a computing device 118 having the configuration and capabilities described herein is located in a roadside device 19. Position and movement information relating to all of the vehicles traveling on the road is sent to the roadside device 19 for processing by the computing device 118. The vehicle information may be acquired by sensors located in the roadside device 19. Alternatively, the vehicle information may be transmitted to the roadside device 19 from one or more of the vehicles 12 and SV. For example, the information relating to each vehicle may be gathered and/or calculated by the INS in the particular vehicle. Alternatively, the roadside device 19 may receive the vehicle information may be received from GPS system 52. In a particular embodiment, roadside device 19 is in communication with a remote terminal 50 configured to receive information (including lane departures) relating to the ego-vehicle 12 and any surrounding vehicles SV.

In one embodiment, position and movement information relating to one or more surrounding vehicles SV is acquired by sensors in a roadside device 19 and transmitted to the ego-vehicle 12 for processing in the manner described herein.

In another embodiment, position and movement information relating to one or more surrounding vehicles SV is acquired by (or received from the SV by) a GPS system 52. This information may then be transmitted from the GPS system to the ego-vehicle 12 for processing in the manner described herein.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A computer-implemented method for operating a vehicle configured for autonomous operation, comprising steps of:
   (1) in a lane departure detection computing device of a roadside device:
      (a) calculating a first path geometry relating to a first vehicle traveling in a first lane;
      (b) calculating a second path geometry relating to a second vehicle traveling in a second lane different from the first lane;
      (c) evaluating coextensive portions of the first path geometry and the second path geometry for parallelism;
      (d) if the coextensive portions of the first path geometry and the second path geometry evaluated for parallelism are parallel, repeating steps (a)-(d);
      (e) if the coextensive portions of the first path geometry and the second path geometry evaluated for parallelism are not parallel, determining that one of the first vehicle and the second vehicle is executing a lane departure; and
   (2) operating the vehicle configured for autonomous operation responsive to the determination that one of the first vehicle and the second vehicle is executing a lane departure.

2. The method of claim 1, wherein the step of evaluating coextensive portions of the first path geometry and the second path geometry for parallelism includes the steps of:
   calculating a first minimum spacing of the second path geometry from the first path geometry at a first location along the first path geometry;
   calculating a second minimum spacing of the second path geometry from the first path geometry at a second location along the first path geometry spaced apart from the first location;
   determining a difference between the first minimum spacing and the second minimum spacing; and
   if the difference is equal to or greater than a predetermined value, determining that the coextensive portions of the first path geometry and the second path geometry residing between the first minimum spacing and the second minimum spacing are not parallel.

3. The method of claim 1 wherein the step of calculating the first path geometry comprises the step of measuring position coordinates of the first vehicle at a rate such that a maximum distance between sensor measurement locations is a predetermined value.

4. The method of claim 1 wherein the step of evaluating coextensive portions of the first path geometry and the second path geometry for parallelism comprises the step of evaluating coextensive portions of the first path geometry and the second path geometry when the first path geometry and the second path geometry are spaced apart at least a minimum predetermined distance.

5. The method of claim 1 wherein the step of evaluating coextensive portions of the first path geometry and the second path geometry for parallelism comprises the step of evaluating coextensive portions of the first path geometry and the second path geometry for parallelism over at least a predetermined length of the first path geometry and the second path geometry.

6. The method of claim 1 further comprising the step of, prior to the step of calculating the first path geometry relating to the first vehicle, receiving information usable for calculating the first path geometry from the first vehicle.

7. The method of claim 6 further comprising step of, prior to the step of calculating the second path geometry relating to the second vehicle, receiving information usable for calculating the second path geometry from the second vehicle.

8. The method of claim 6 wherein the roadside device includes one or more sensors configured for acquiring information usable for calculating the second path geometry, and wherein the method further comprises the step of, prior to the step of calculating the second path geometry relating to the second vehicle, acquiring vehicle information usable for calculating the second path geometry by the one or more sensors of the roadside device usable for calculating the second path geometry.

9. The method of claim 1 wherein the roadside device includes one or more sensors configured for acquiring information usable for calculating the first path geometry, and wherein the method further comprises the step of, prior to the step of calculating the first path geometry relating to the first vehicle, acquiring vehicle information usable for calculating the first path geometry by the one or more sensors of the roadside device configured for acquiring information usable for calculating the first path geometry.

10. The method of claim 9 further comprising the step of, prior to the step of calculating the second path geometry relating to the second vehicle, receiving information usable for calculating the second path geometry from the second vehicle.

11. The method of claim 9 wherein the roadside device includes one or more sensors configured for acquiring information usable for calculating the second path geometry, and wherein the method further comprises the step of, prior to the step of calculating the second path geometry relating to the second vehicle, acquiring vehicle information usable for calculating the second path geometry by the one or more sensors of the roadside device configured for acquiring information usable for calculating the second path geometry.

12. The method of claim 1 further comprising the step of, prior to at least one of the steps of calculating the first path geometry relating to the first vehicle traveling in the first lane and calculating the second path geometry relating to the second vehicle traveling in the second lane, receiving, from a GPS system, information usable for calculating the at least one of the first path geometry relating to the first vehicle traveling in the first lane and the second path geometry relating to the second vehicle traveling in the second lane.

13. The method of claim 1 wherein the vehicle configured for autonomous operation is a third vehicle separate from the first vehicle and the second vehicle.

14. The method of claim 1 wherein the vehicle configured for autonomous operation is one of the first vehicle and the second vehicle.

15. The method of claim 1 wherein the vehicle configured for autonomous operation includes a vehicle computing device configured for operating the vehicle configured for autonomous operation responsive to a determination by the lane departure detection computing device that one of the first vehicle and the second vehicle is executing a lane departure, wherein the method further comprises transmitting, to the vehicle configured for autonomous operation, information including the determination that one of the first vehicle and the second vehicle is executing a lane departure, and wherein the step of operating the vehicle configured for autonomous operation comprises operating the vehicle configured for autonomous operation by the vehicle computing device.

16. The method of claim 1 wherein the step of operating the vehicle configured for autonomous operation comprises operating the vehicle by the lane departure detection computing device of the roadside device.

17. The method of claim 1 further comprising the step of, after step (1)(c) and before step (1)(d):
if the coextensive portions of the first path geometry and the second path geometry evaluated for parallelism are parallel, determining at least a portion of a road geometry from the coextensive portions of the first path geometry and the second path geometry evaluated for parallelism.

18. A non-transitory computer readable medium with computer executable instructions stored thereon executed by a processor to perform a method of operating a vehicle configured for autonomous operation, the method comprising:
(a) calculating a first path geometry relating to a first vehicle traveling in a first lane;
(b) calculating a second path geometry relating to a second vehicle traveling in a second lane different from the first lane;
(c) evaluating coextensive portions of the first path geometry and the second path geometry for parallelism;
(d) if the coextensive portions of the first path geometry and the second path geometry evaluated for parallelism are parallel, repeating steps (a)-(d);
(e) if the coextensive portions of the first path geometry and the second path geometry evaluated for parallelism are not parallel, determining that one of the first vehicle and the second vehicle is executing a lane departure; and
(f) operating the vehicle configured for autonomous operation responsive to the determination that one of the first vehicle and the second vehicle is executing a lane departure.

19. A lane departure detection computing device for a roadside device, the computing device comprising one or more processors for controlling operation of the computing device, and a memory for storing data and program instructions usable by the one or more processors, wherein the one or more processors are configured to execute instructions stored in the memory to:
calculate a first path geometry relating to a first vehicle traveling in a first lane;
calculate a second path geometry relating to a second vehicle traveling in a second lane different from the first lane;
evaluate coextensive portions of the first path geometry and the second path geometry for parallelism;
if the coextensive portions of the first path geometry and the second path geometry evaluated for parallelism are not parallel, determine that one of the first vehicle and the second vehicle is executing a lane departure; and
operate a vehicle configured for autonomous operation responsive to the determination that one of the first vehicle and the second vehicle is executing a lane departure.

* * * * *